Figure 1:
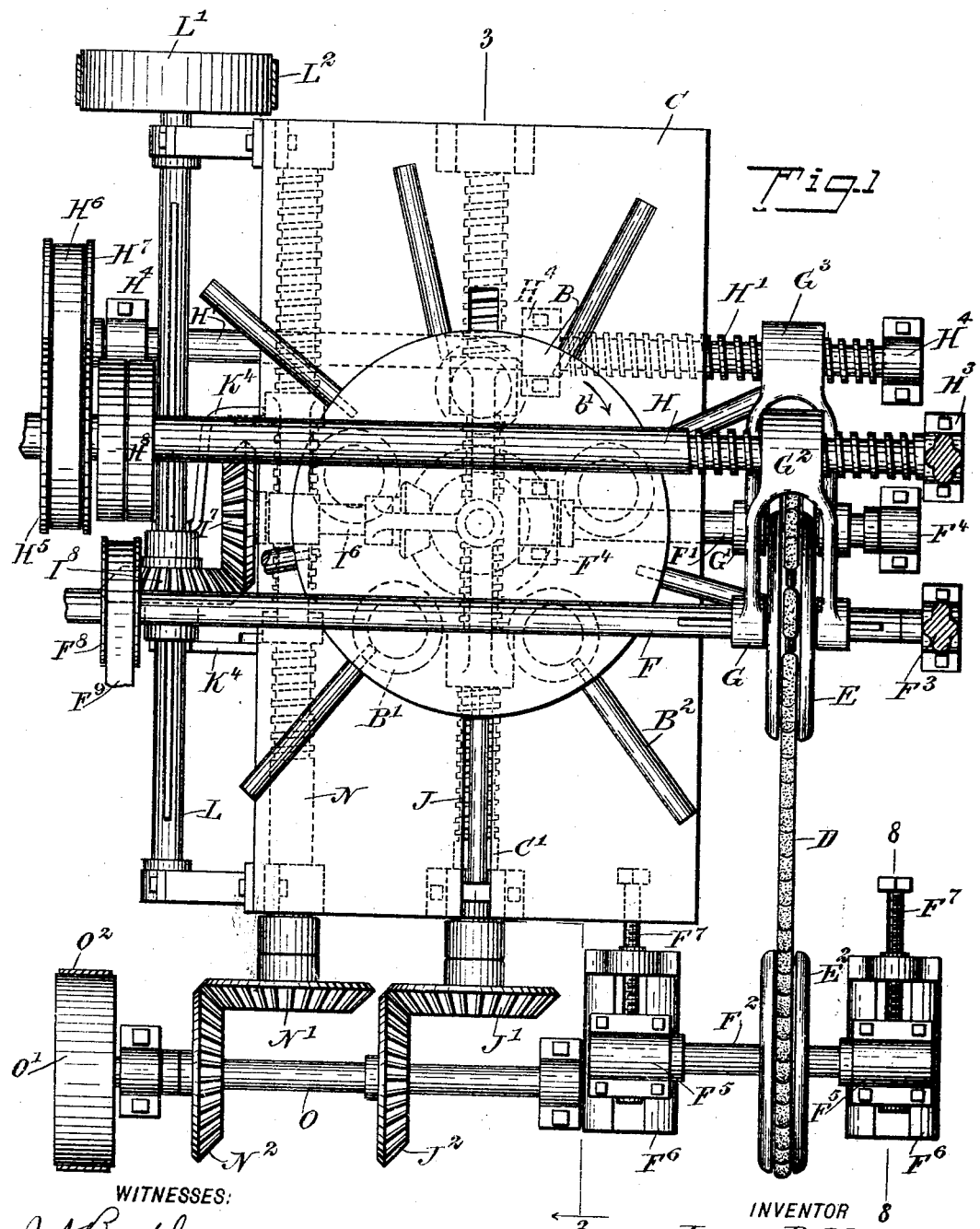

No. 771,065. PATENTED SEPT. 27, 1904.
J. B. HANLEY.
STONE SAWING MACHINE.
APPLICATION FILED JAN. 12, 1904.
NO MODEL. 4 SHEETS—SHEET 1.

WITNESSES:
J. A. Brophy
Thos. G. Hosler

INVENTOR
James B. Hanley
BY
Munn
ATTORNEYS

No. 771,065. PATENTED SEPT. 27, 1904.
J. B. HANLEY.
STONE SAWING MACHINE.
APPLICATION FILED JAN. 12, 1904.
NO MODEL. 4 SHEETS—SHEET 2.
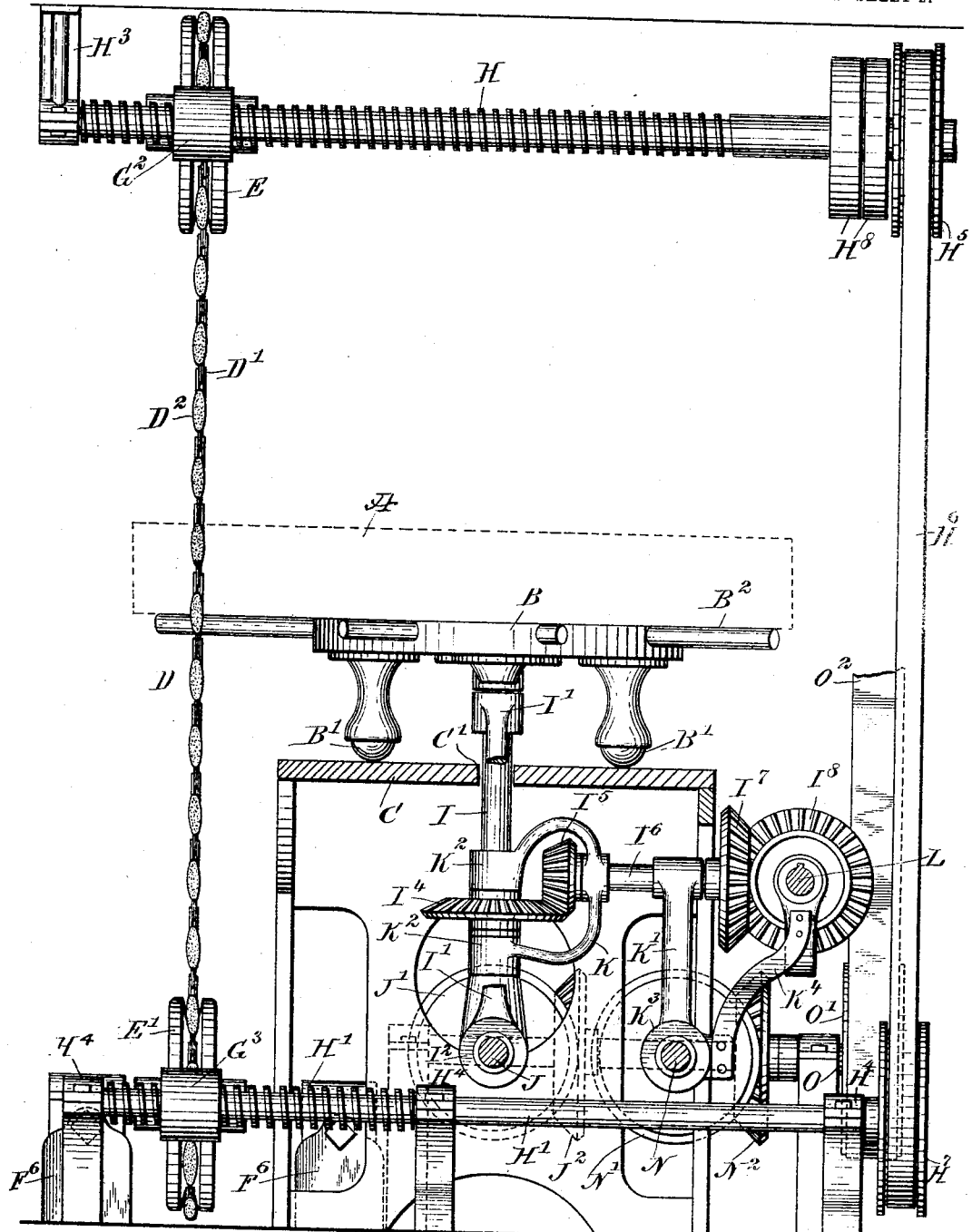
WITNESSES: Fig. 2. INVENTOR
James B. Hanley
BY
ATTORNEYS

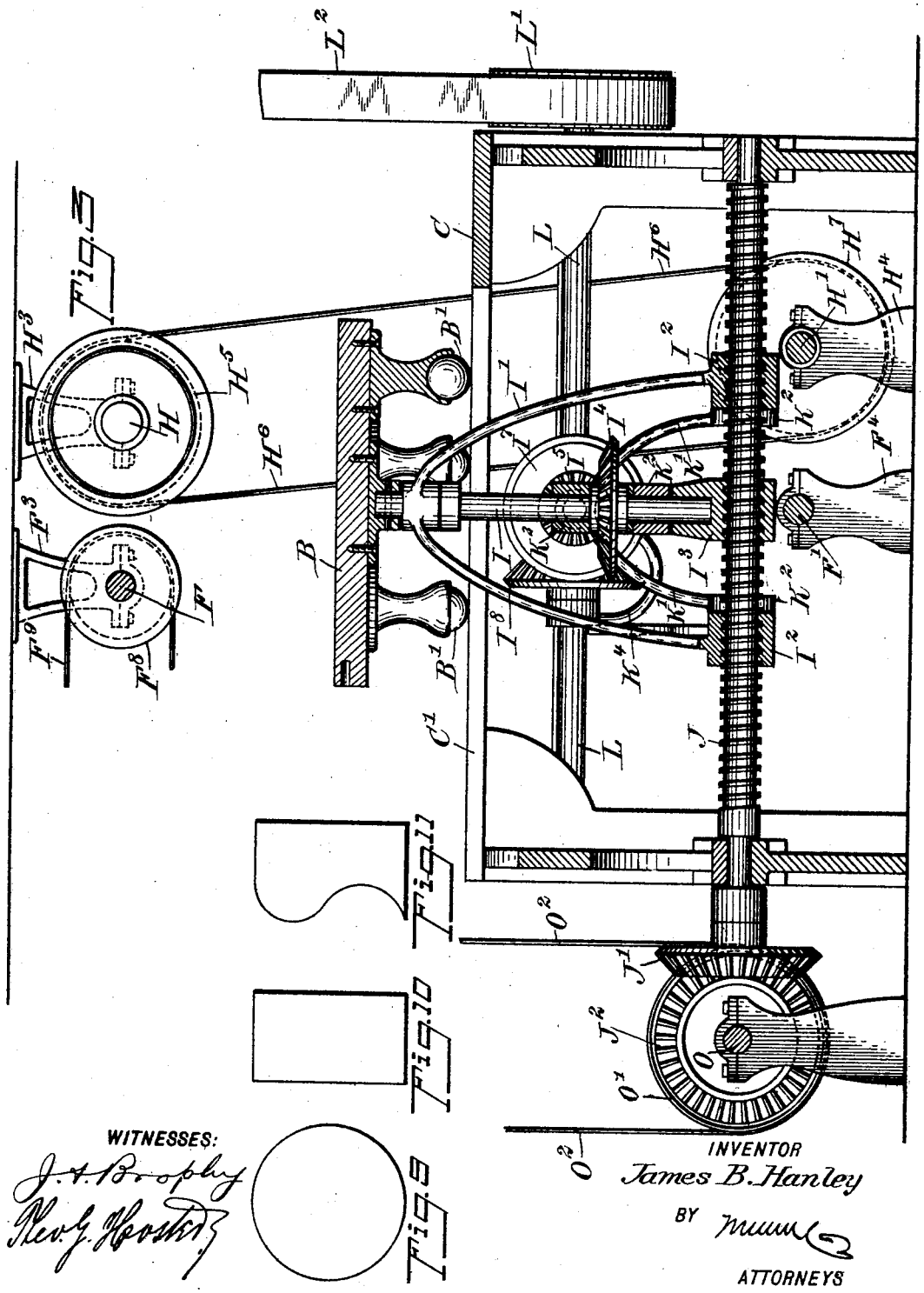

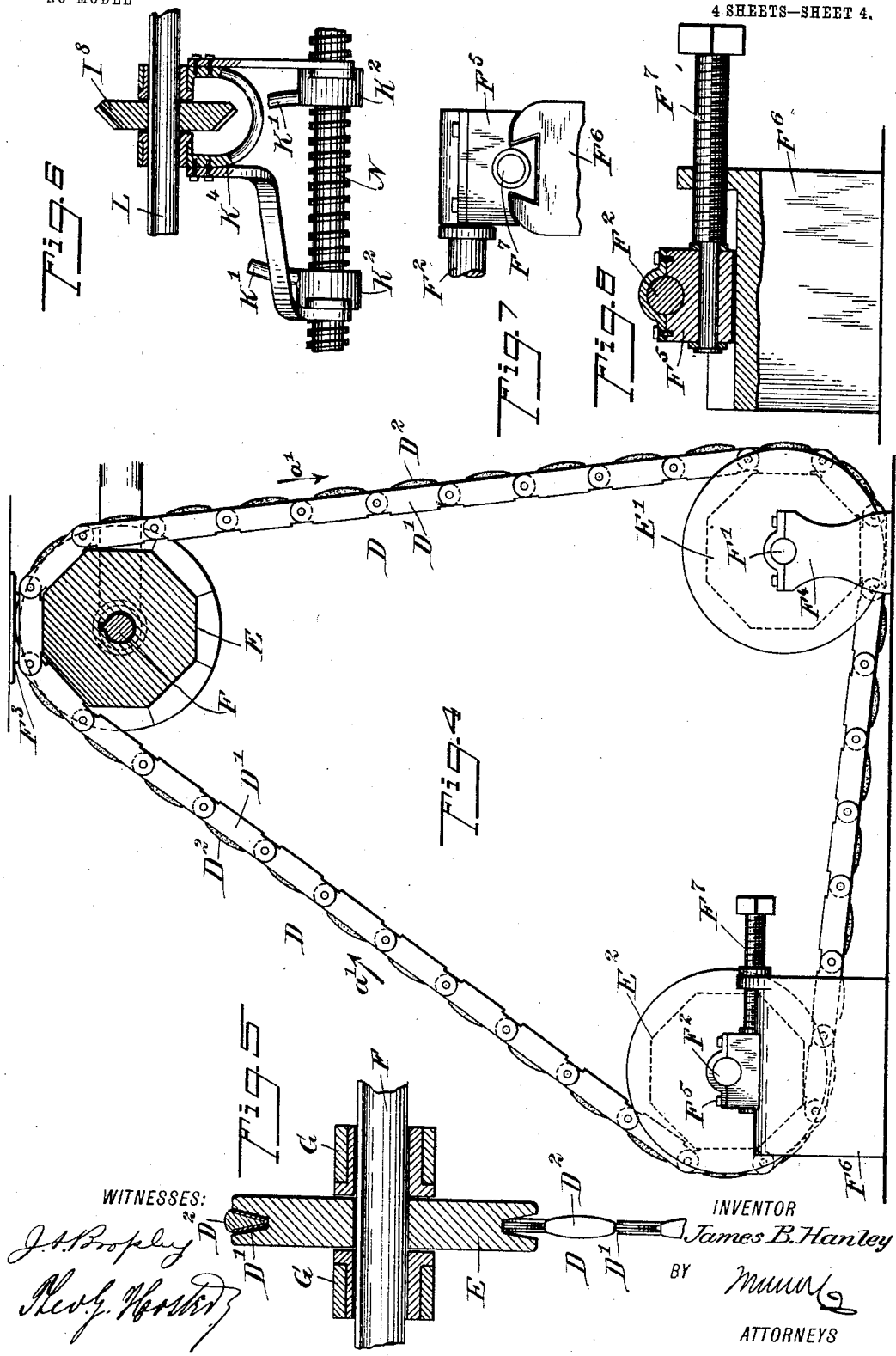

No. 771,065.  
Patented September 27, 1904.

UNITED STATES PATENT OFFICE.

JAMES B. HANLEY, OF NEW YORK, N. Y.

STONE-SAWING MACHINE.

SPECIFICATION forming part of Letters Patent No. 771,065, dated September 27, 1904.

Application filed January 12, 1904. Serial No. 188,753. (No model.)

*To all whom it may concern:*

Be it known that I, JAMES B. HANLEY, a citizen of the United States, and a resident of the city of New York, borough of Manhattan, in the county and State of New York, have invented a new and Improved Stone-Sawing Machine, of which the following is a full, clear, and exact description.

The object of the invention is to provide a new and improved stone-sawing machine arranged for making straight or curved cuts in the stone block to cut the latter to any desired shape.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement, the overhead bearings being shown in section. Fig. 2 is a front end view of the same. Fig. 3 is a longitudinal sectional elevation of the same on the line 3 3 of Fig. 1. Fig. 4 is a side elevation of the endless chain saw and its mounting, one of the saw-wheels being in section. Fig. 5 is an enlarged cross-section of part of the same. Fig. 6 is a sectional side elevation of part of the circular feed for the bed supporting the stone block. Fig. 7 is a front end elevation of one of the adjustable bearings for the spindle of the lower rear saw-wheel. Fig. 8 is a longitudinal sectional elevation of the same on the line 8 8 of Fig. 1; and Figs. 9, 10, and 11 are face views of different-shaped work produced by the machine.

The block A to be sawed is held on a bed B, provided with roller-casters B', mounted to travel on a table C, the said bed B, and with it the block A, being adapted to be turned when it is desired to cut the block into circular shape or is adapted to travel longitudinally when it is desired to make straight cuts, as hereinafter more fully explained.

The block A is adapted to be sawed by an endless chain saw D, formed of links D' pivotally connected with each other, each link supporting a tooth $D^2$, preferably formed of emery or other material. As indicated in Fig. 5, the tooth-carrying links are preferably made V shape in cross-section, so as to readily receive the tooth material and to allow the links of the chain to clear themselves when cutting in a circular manner, and the tooth projects beyond the front edge of the corresponding link and also beyond the sides of the link, as plainly indicated in the drawings. The endless chain saw D described passes over wheels E, E', and $E^2$, of which the wheels E and E' are approximately located one above the other, so as to produce an upright run of the endless belt saw for doing the cutting on the block A, as hereinafter more fully described. The wheels E, E', and $E^2$ are preferably polygonal in shape, as plainly indicated in Fig. 4, so that each link fits on a side of the polygon, and the wheels are formed with peripheral flanges, beveled at the inner faces to receive snugly the V-shaped links D' of the endless chain saw, as will be readily understood by reference to Fig. 5.

The wheels E, E', and $E^2$ are mounted to turn with shafts F, F', and $F^2$, of which the shaft F is journaled in overhead bearings $F^3$, while the shaft F' is journaled in floor-bearings $F^4$, and the shaft $F^2$ is journaled in bearings $F^5$, mounted to slide longitudinally on guideways $F^6$, attached to the floor or other foundation, and the said bearings $F^5$ are each engaged by a screw-rod $F^7$, mounted to turn in the corresponding guideway $F^6$ to allow of adjusting the bearings $F^5$ longitudinally to hold the endless chain saw D sufficiently taut to properly do the work.

The endless chain saw D is bodily adjustable toward and from the bed B, so as to allow of cutting the block A into larger or smaller disks, as hereinafter more fully described, and also to allow of making irregularly-curved cuts by adjusting both the saw and the bed B, as hereinafter more fully explained. For the purpose mentioned the wheels E, E', and $E^2$ are mounted to slide lengthwise on their shafts F, F', and $F^2$, and the wheels E and E' are engaged at opposite faces by forks G and G', formed with integral nuts G² and G³, in which screw screw-rods H and H', of which the screw-rod H is journaled in overhead bearings H³ and the screw-rod H' is journaled in floor-bearings H⁴. The two screw-rods H and H' rotate in unison, and for this purpose the screw-rod H is provided with a pulley H⁵, over which passes a belt H⁶, also passing over a pulley H⁷ on the screw-rod H'. On the screw-rod H are secured fast and loose pulleys H⁸, connected by belt with other machinery, the belt being under the control of the operator, so that when the belt is moved onto the fast pulley the screw-rods H and H' are simultaneously rotated to cause the nuts G² and G³ to travel lengthwise on the screw-rods, whereby the forks G and G' shift the wheels E and E' on their shafts F and F' either to the right or to the left, according to the direction in which the upper screw-rod H is turned. It is understood that suitable means are provided for turning the fast pulley either to the right or left to cause a shifting of the wheels E and E', and consequently of the saw D, either toward or from the bed B and the work thereon. The shaft of the wheels E and E' causes the saw D to shift the rear wheel E² correspondingly on the shaft F² without the use of a fork, nut, and screw-rod, as above described.

When it is desired to make circular cuts by the upright run of the saw D, it is necessary to rotate the bed B, and with it the work thereon, and for this purpose the following device is provided: The bed B is secured at its under side to the upper end of a shaft I, mounted to rotate in a frame I', having its lower end provided with nuts I², in which screws a screw-rod J, journaled in suitable bearings carried by the front and rear ends of the table C. (See Fig. 3.) The lower end of the shaft I is held in a step I³, also in the shape of a nut, in which screws the screw-rod J. On the shaft I is secured a bevel gear-wheel I⁴, in mesh with a pinion I⁵, secured on a transverse shaft I⁶, journaled in bearings K and K', and on the shaft I⁶ is secured a bevel gear-wheel I⁷, (see Fig. 2,) in mesh with a bevel gear-wheel I⁸, mounted to turn with and slide on a longitudinally-extending shaft L, connected at the inner end by a pulley L' and belt L² with other machinery for imparting a rotary motion to the shaft L whenever it is desired to do so. Now the rotary motion given to the shaft L is transmitted by the gear-wheels I⁸ and I⁷ to the shaft I⁶, which by the pinion I⁵ and gear-wheel I⁴ rotates the shaft I, and as the bed B is secured on this shaft the bed rotates with the shaft, and consequently the block A is rotated for the saw to make a circular cut in the block.

When it is desired to move the bed B, and with it the block A, in a longitudinal direction, the following device is provided: The bearing K', carrying one end of the shaft I⁶, is formed with bearings K², engaging the shaft I above and below the gear-wheel I⁴, and the bearing K' for the shaft I⁶ is provided with a nut K³, in which screws a screw-rod N, extending longitudinally and journaled in bearings at the front and rear ends of the table C, the same as the shaft J, previously described. The rear ends of the screw-rods J and N are provided with bevel gear-wheels J' and N', in mesh with bevel gear-wheels J² and N², secured on a shaft O, (see Fig. 1,) connected by a pulley O' and belt O² with other machinery for imparting a rotary motion to the shaft O whenever it is desired to do so. The rotary motion of the shaft O is transmitted by the sets of bevel gear-wheels J² J' and N² N' to the screw-rods J and N, so that the nuts I² and K³ are simultaneously and in unison moved longitudinally to shift the shafts I and I⁶ bodily in a longitudinal direction, so that the bed B, and with it the work, is moved longitudinally. In order to keep the gear-wheels I⁷ and I⁸ in mesh, the gear-wheel I⁸ is shifted lengthwise on its shaft L at the time the shaft I⁶, and with it its gear-wheel I⁷, is moved longitudinally, as described, and for this purpose the gear-wheel I⁸ is engaged on opposite sides by the members of a fork K⁴, secured to the nut K³ of the bearing K'.

By the arrangement described it is possible to impart a simultaneous rotary motion to the bed B, as well as to cause the bed to travel longitudinally—that is, whenever the shafts L and O are caused to rotate simultaneously. It is expressly understood, however, that the bed B may be rotated only by the mechanism above described, or it may be shifted longitudinally without being rotated; but the bed may be simultaneously rotated and shifted longitudinally whenever it is desired to do so. As illustrated in Figs. 1, 2, and 3, the shaft I extends through one open side of the support or table to allow ready longitudinal movement of the said shafts I and I⁶, as above explained.

The operation is as follows: When it is desired to saw circular blocks, (see Fig. 9,) the saw D is shifted bodily in a transverse direction, as above described, to bring the upright run of the saw nearer to or farther from the center of the bed B, according to the radius of the circular block to be cut. The bed B is preferably first shifted in a longitudinal direction to bring the center of the bed in transverse alinement with the front or cutting edge of the upright run of the saw D. After the adjustment referred to is made the shafts F and L are caused to rotate simultaneously, so that the saw D is caused to travel in the direction of the arrow a' (shown in Fig. 4) and the bed B, with the block A thereon, is caused to rotate in the direction of the arrow b' (see Fig. 1) to feed the block A to the saw D for the latter to cut the block into circular shape on the completion of a revolution of the bed B. When it is desired to make straight cuts for sawing rectangular blocks, for instance, as shown in Fig. 10, the shaft L is not rotated, but the shafts F and O are caused to rotate for the saw to travel as above described and for the bed B to travel longitudinally from the front of the machine rearwardly, so that the block carried by the bed is cut in a straight line in the direction of the feed of the bed B. When it is desired to make irregularly-curved cuts—for instance, an ogee-shaped cut, as shown in Fig. 11—then a rotary motion is caused to be given to the shafts F, H, L, and O, so that the saw D is caused to travel in the direction of the arrow $a'$ and is shifted bodily in a transverse direction and the bed B is both rotated and caused to travel longitudinally. The shafts H, L, and O are rotated either at the same or at a varying speed, according to the curvature of the cut to be made, it being understood that by moving the block to be sawed longitudinally and rotating it at the same time and while the saw is bodily shifted any desired form of cut can be obtained. If necessary, either of the shafts H, L, and O may be stopped at any time if the form of the curve should require such action.

The bed B is provided in its peripheral face with spaced recesses for the insertion of pegs $B^2$ or the like to support the material cut from the block A, it being understood that such pegs are inserted and removed at the will of the operator and as circumstances require. Suitable devices such as clamps, &c., may be used to hold the block A in position on the bed B.

Having thus described my invention, I claim as new and desire to secure by Letters Patent—

1. A sawing-machine provided with a bed for supporting the block to be sawed, means for simultaneously revolving the said bed and feeding it forward or backward, an endless chain saw for cutting the said block, and means for shifting the saw bodily toward or from the said bed, as set forth.

2. A sawing-machine provided with a bed for supporting the block to be sawed, means for feeding the same according to the form of the cut to be made, an endless chain saw having saw-teeth mounted on the links of the endless chain saw, and means for shifting the said saw bodily relative to the bed, as set forth.

3. In a sawing-machine, in combination, a table, a shaft disposed longitudinally with respect to said table, a bevel-gear slidably carried by said shaft and adapted to rotate therewith, a substantially vertical shaft, a bed carried thereby, a bevel-gear rigid with said last shaft, an auxiliary shaft, bevel-gears carried thereby and meshing respectively with said first bevel-gears, means for supporting said auxiliary shaft, and a cutting-tool coöperating with said bed, as set forth.

4. In a sawing-machine, in combination, a table, a shaft disposed longitudinally with respect to said table, a bevel-gear slidably carried by said shaft and adapted to rotate therewith, a substantially vertical shaft, a bed carried thereby, a bevel-gear rigid with said last shaft, an auxiliary shaft, bevel-gears carried thereby and meshing respectively with said first bevel-gears, means for supporting said auxiliary shaft, a cutting-tool coöperating with said bed, and means for feeding said bed longitudinally of said table, as set forth.

5. In a sawing-machine, in combination, a table, a bed, means for supporting said bed upon said table, means for rotating said bed upon a substantially vertical axis, means for advancing said bed longitudinally upon said table, a plurality of shafts disposed transversely of said table, chain-wheels slidably mounted thereupon, means for advancing said chain-wheels longitudinally on said shafts, and a chain saw passing over said chain-wheels, as set forth.

6. In a stone-sawing machine, in combination, a movable bed adapted to support a stone, a plurality of transversely-disposed shafts, chain-wheels carried respectively thereby, transverse screw-rods and forks making threaded engagement therewith, said forks affording means for shifting certain of said chain-wheels laterally, as set forth.

7. A sawing-machine having an endless chain saw, wheels over which passes the said chain saw, means for driving one of the wheels, to cause the chain saw to travel, and means for simultaneously shifting the wheels laterally, as set forth.

8. A sawing-machine having an endless chain saw, the links of which are V-shaped in cross-section, and each is arranged to receive a saw-tooth of a hard substance, as set forth.

9. A sawing-machine having an endless chain saw, the links of which are V-shaped in cross-section, and each is arranged to receive a saw-tooth of a hard substance, and wheels having V-shaped peripheral grooves for the passage of the said links, as set forth.

10. A sawing-machine having an endless chain saw, the links of which are V-shaped in cross-section, and each is arranged to receive a saw-tooth of a hard substance projecting beyond the front edges of the links and spread beyond the sides thereof, as set forth.

In testimony whereof I have signed my name to this specification in the presence of two subscribing witnesses.

JAMES B. HANLEY.

Witnesses:
 FRANCIS D. CASEY,
 JERE F. HANLEY.